United States Patent Office 3,333,016
Patented July 25, 1967

3,333,016
POLYMERIZATION PROCESS
Robert G. Schultz, Vinita Park, Mo., assignor to Monsanto Company, St. Louis, Mo., a corporation of Delaware
No Drawing. Filed Jan. 28, 1963, Ser. No. 254,433
17 Claims. (Cl. 260—683.15)

This invention relates to the polymerization of gaseous alpha-olefins of from 2 to 3 carbon atoms to normally low-boiling liquid products. More particularly this invention relates to an improved process for preparing low-boiling liquid dimers or trimers of gaseous alpha olefins of from 2 to 3 carbon atoms and to a catalyst to be used in such process.

Presently known processes for polymerizing gaseous alpha olefins involve contacting the alpha-olefins, e.g., ethylene and propylene, with a cobalt on carbon catalyst prepared by heating a cobalt salt impregnated carbon in a reducing atmosphere, particularly in the presence of hydrogen to reduce substantially all of the cobalt derived from the cobalt salt to the metallic state. Another prior process for polymerizing propylene requires that nitric acid be used to wash the carbon prior to its being impregnated with the cobalt salt in preparing the catalyst.

By such prior art processes it was desired to produce either solid polymer products, oily products to be used as lubricating oils, or highly branched liquid gasoline fuels. However, I have discovered that the use of catalyst compositions and polymerization processes of the above general types do not produce the desired type of low-boiling liquid products which are suitable as intermediates in the preparation of biodegradable detergents. For purposes of preparing biodegradable detergents, it is thought suitable that the liquid olefins, used in preparing the detergent chemicals, e.g., to alkylate arene compounds such as phenol, toluene, and benzene, etc. which are then sulfonated according to conventional techniques, have as straight a carbon to carbon chain as is economically and technologically obtainable. The total carbon content in the olefin to be used to alkylate the arene compound is desirably between about 10 to 16 carbon atoms.

One route to obtain such substantially straight chain olefins having from 10 to 16 carbon atoms is to dimerize or trimerize lower olefins ($C_4$ to $C_8$) which are themselves substantially straight chain. Examples of such olefins which could be used are the butenes, pentenes, hexenes, heptenes, and octenes. It follows that the straighter these lower olefins are the better are the chances of obtaining larger yields of straight chained higher olefins. It is preferred also, but not required, that the lower olefin to be used in the dimerizing process have the olefin double bond in a terminal position, i.e., in an alpha- or 1-position.

By the use of various catalytic materials $C_4$ to $C_8$ carbon olefin mixtures of various isomeric structures have been obtained. Various percentages of these $C_4$–$C_8$ olefin mixtures are olefin compounds which are suitable for use in making biodegradable detergent products. It is then necessary to separate the desirable isomers from those which are not wanted. This is usually done by distillation, and other techniques known in the art. However, in such processes some undesired isomers are not readily removed from the desired products by conventional techniques because of similar physical or chemical properties such as similar boiling points. For example, 2-methylpentene-2 is an especially undesired isomer in hexene fractions from propylene dimerizations for the purposes of this invention because it is not separated from n-hexenes by commercial methods of distillation and therefore special procedures must be adopted to separate it from the n-hexenes or it must remain as an impurity.

It is desirable therefore, to find methods for preparing low-boiling liquid olefin products having high percentages of the desired isomers while eliminating or keeping at a low level the production of undesired isomers in the liquid olefin product so that the above referred to separation steps can be minimized or eliminated altogether.

It is therefore an object of this invention to provide a method for polymerizing normally gaseous alpha-olefins of from 2 to 3 carbon atoms so as to obtain a liquid olefin product in increased yields while minimzing or eliminating altogether the production of difficultly removable isomer products.

It is another object of this invention to provide a catalyst which is useful in the polymerization of normally gaseous alpha olefins of from 2 to 3 carbon atoms to normally liquid olefin products.

It is a particular object of this invention to provide a method for dimerizing ethylene and propylene to normally liquid olefin products while eliminating or substantially reducing the production of isomers which are not removable from the n-olefin fraction by normal distillation methods.

Other objects, and advantages of this invention will be apparent from the description and claims hereinbelow.

Briefly, the objects set forth above are accomplished according to this invention by polymerizing the normally gaseous alpha-olefin of from 2 to 3 carbon atoms using a catalyst which has been prepared by first treating an activated carbon with a treating gas selected from the group consisting of hydrogen, nitrogen, and hydrogen-nitrogen mixtures thereof, impregnating the gas treated carbon with a cobalt salt of an oxygen-containing mineral acid salt, preferably in an aqueous solution, drying the cobalt salt-impregnated carbon, and heating the cobalt salt-impregnated carbon to decompose the cobalt salt to the cobalt oxide, and activate the catalyst, say, at from about 200° C. to about 550° C., but preferably at from 200° C. to 300° C.

For the purpose of this invention, unless otherwise defined the term "treating gas," when used in reference to the treatment of carbon as disclosed and described herein, means hydrogen, nitrogen, hydrogen-nitrogen gas mixtures, and inert gases containing hydrogen and/or nitrogen.

It has been found according to this invention that the gas treatment of the carbon, prior to impregnation of carbon with the cobalt salt, enables the obtaining of higher yields of liquid olefin product in the polymerization step than is obtained when untreated carbon is impregnated with the cobalt salt without first being treated with such a treating gas, while at the same time eliminating or substantially reducing the production of only difficultly removable isomers in the n-olefin fraction.

In this specification and claims the term "gaseous alpha-olefin of from 2 to 3 carbon atoms" means ethylene and propylene. These alpha-olefins may be either in the gaseous state, or dissolved in a suitable liquid diluent such as benzene, toluene, cyclohexane, decahydronaphthalene, hexane, heptane, etc. or as a compressed liquid, either alone or diluted with liquid alkanes.

The term "drying" in reference to catalyst preparation means removing substantially all of the visible liquid water therefrom, i.e., until the treated carbon is visibly dry.

After the gas treatment of the carbon, the thus treated carbon thus obtained is then treated with a solution of the cobalt salt, preferably an aqueous solution of an oxygen containing acid, examples of said salts being cobalt acetate, cobalt sulfate, and preferably cobalt nitrate in the cobaltous form.

Other cobalt salts which may be used but which are less preferred, are the cobalt salts of the alkanoic acids having say 3 to 6 carbon atoms, such as cobalt propionate, cobalt butanoate, pentanoate, cobalt hexanoate, as well as cobalt ammonium sulfate, cobalt arsenate, cobalt arsenite, cobalt carbonate, cobalt chromate, cobalt vanadate, cobalt molybdate, cobalt iodate, cobalt oxalate, cobalt citrate, cobalt sulfite, etc. After impregnation of the treated carbon, the cobalt salt-impregnated gas treated carbon, thus obtained, is dried, then optionally, but preferably, treated with ammonium hydroxide, and then dried and activated by heating the composition so obtained to a temperature of at least about 200° C. but not above about 550° C., and preferably not above about 300° C. We have found that the ammonium hydroxide gives longer catalyst life to the cobalt oxide on carbon composition compared to cobalt oxide on carbon catalyst compositions prepared similarly but without the ammonium hydroxide treatment.

The gas pre-treatment of the carbon according to this invention may be accomplished by any means which affords contact of the carbon and the treating gas. For example, the treating gas and carbon may be contacted by putting the carbon in a pressure vessel and then pressuring the vessel with the treating gas. However, it is preferred to pass a gas stream over or through a bed of the carbon at a temperature of from about 190° to 500° C., more preferably from 200° to 300° C. Atmospheric or superatmospheric pressures may be used but, for reasons of safety, it is preferred to pass the treating gas over the carbon under reduced pressure. Preferred reduced pressures are from 20 to 100 mm. of Hg. The time of contact between the carbon and the treating gas is sufficient if the carbon and treating gas have been in contact at the stated temperature for, e.g., as little as five minutes to five hours. The passing of the treating gas over the carbon while raising the temperature to the desired degree of temperature is generally sufficient but it is preferred to pass the treating gas over the carbon at a flow rate of from 50–150 ml. of gas per minute in a standard laboratory activation tube at from 200 to 300° C. for from 1 to 5 hours under reduced pressure. It is understood that the optimum rate of flow of the treating gas, the time, the temperature, etc., will vary with the selection of the apparatus used to conduct the treatment.

The activated carbons useful for the purpose of this invention may be any porous carbon known to be useful for catalyst preparation. The activated carbons of this type generally have surface areas of from about 400 sq. m. to 2000 sq. m. per gram. These carbons may be in the form of compact masses, granules, chips, powder, etc., although the powder form is not preferred. The activated carbons may be from animal or vegetable or petroleum source. For example, there may be used coconut charcoal, wood charcoal, and coke derived from coal, but natural untreated coal itself does not give an effective catalyst for use in the process of this invention, and is not an activated carbon. Other useful carbons include soft bone charcoal, hard bone charcoal, and carbons sold under various trade names for catalyst preparation purposes. Examples of activated carbons sold in commerce include Pittsburgh "BPL," "CAL," "OL," and "SGL" of Pittsburgh Coke and Chemical Co., Girdler "G–32–C," and "G–32–E" of Chemical Products Division, Chemetron Corp., and Barnebey-Cheney Company's "EE–1," "E–H–1" and other activated carbons. The activated carbons may be washed or unwashed. A preferred wash treatment comprises washing the carbon with aqueous nitric acid, e.g., a dilute nitric acid solution, employing for example about 600–1000 ml. of nitric acid per 500 ml. of charcoal. The nitric acid can be of any desired concentration but preferably has a concentration of about 10 to 30 weight percent in water. Contact periods of nitric acid and charcoal of about 5 minutes to 0.5 hour are sufficient to wash the carbon. After the acid wash step the acid treated carbon may be washed with water to remove the acid prior to gas treatment of the carbon.

After the necessary gas treatment the carbon is impregnated with a solution, preferably aqueous, of the desired amount of the cobalt salt. The cobalt salt solution used is one having a concentration which is calculated to give the desired amount of cobalt oxide on the carbon when activated. For example, a solution of about 100–101 g. of cobalt nitrate · 6 $H_2O$ in 250 ml. of dimineralized water was used in preparing one catalyst composition by impregnating this solution into 180 g. of gas treated carbon. After impregnation, the cobalt salt treated carbon is then dried until outwardly dry, e.g., by warming, by heating the treated carbon to from 80° to 180° C. under vacuum for from 1 to 5 hours, with occasional agitation to obtain a uniformly treated carbon. Time periods of from 0.25 to 1 hour are generally sufficient to accomplish the impregnation of the carbon if it is agitated as by stirring, tumbling, shaking, etc.

We have found it to be particularly valuable to the polymerization process of this invention to treat a dried cobalt salt-impregnated gas treated carbon to an ammonium hydroxide solution treatment prior to activation of the catalyst.

The ammonium hydroxide treatment may be done batch-wise or continuously by suitable choice of equipment. The treated carbon is allowed to take up as much ammonium hydroxide as it is able, and then the thus treated carbon is dried as before, and activated. Additional details of the ammonium hydroxide treatment of the cobalt salt impregnated carbon prior to activation are found in copending application S.N. 229,192, filed Oct. 8, 1962, which is incorporated herein by reference to avoid undue length in this specification.

The gas treated carbon containing the cobalt salt thereon is activated for use in the polymerization reaction by heating the treated carbon, thus obtained, to temperatures to above about 200° C. but not in excess of about 550° C., preferably at from about 200° C. to 300° C. Catalysts activated at temperatures above about 300° C. may be used if increased amounts of branched chain isomerization products such as 2-methylpentene-2 which arises from cis- and trans-4-methylpentene-2 in the propylene dimer product are not detrimental to the purposes for which the product is intended to be used. However, for the production of biodegradable detergent grade olefins of high quality I prefer to use catalysts activated at temperatures not above 300° C., optimumly at about 225° C. to 280° C. Without being restricted to the theoretical reason for it, I believe that the higher activation (about 300° C.) temperatures cause the active sites on the catalyst composition to be changed from the desired dimerization promoters to an isomerization promoter which is not desired in this invention. That is, it is not desired to use a catalyst composition having a high degree of isomerization activity but rather it is desired that the catalyst be primarily one which promotes simple dimerization. In any event, I have discovered that these results are best obtained with the present catalysts by maintaining the activation temperature below about 300°. Above this temperature proportionately more isomerization to difficultly removable isomers is noted.

The activation of the catalyst composition is preferably conducted in the presence of an inert gas such as nitrogen, helium, methane, propane, carbon dioxide, or a vacuum atmosphere etc. Optionally, the catalyst may be heated in the presence of air to the desired temperature, and then the air may be flushed out or removed and replaced with an inert gas for a short time prior to the termination of the activation treatment. For example, in continuous runs for polymerizing the olefin, the catalyst is placed in a basket and gas or liquid feed is passed through this basket. It is within the scope of this invention to activate the catalyst composition by heating it in air for a time and then just prior to its use in the continuous polymerization process, to pass an inert gas over it for a short time, say, from 0.1 to 1 hour at the desired activation temperature just prior to the polymerization reaction.

The time period for the activation treatment can be any period required to raise the temperature of the catalyst composition to the desired temperature. Generally, time periods from 0.5 to 10 hours are sufficient to activate the catalyst to the desired activity. Preferred times of from 2 to 5 hours are used to insure complete activation in efficient time periods. Often times the catalyst composition is activated by gradually raising the temperature from the last drying step under vacuum to the desired temperature. For example, optimum activation conditions for preparing a catalyst for use in dimerizing propylene to products useful in preparing biodegradable olefins in an economical manner involve heating the dried gas treated carbon impregnated with cobalt nitrate, and treated with ammonium hydroxide, to a temperature of about 200° C. to 280° C. while passing an inert gas, such as nitrogen, through the activation vessel for from 0 to 5 hours under vacuum of about 5 to 760 mm. of mercury, preferably 35 to 50 mm. of mercury.

Just prior to use in the polymerization reaction but after activation it is preferred that the catalyst should not be in contact with air. To prevent this I have transferred the activated catalyst from one container to another, especially for use in batch type reactions as needed, under nitrogen or other inert atmosphere to prevent any possible deactivation by deleterious materials. However, I have found that if these catalysts are exposed to air in an amount to deactivate them for alpha-olefin dimerization reactions of this invention, the catalyst can be re-activated by heat treatment under the conditions described above.

It has been found according to this invention that catalyst compositions prepared and activated as described above substantially improve the dimer isomer distribution ratio in the low boiling liquid product obtained by polymerizing gaseous alpha-olefins of from 2 to 3 carbon atoms using the above described catalysts. Activation temperatures for these catalysts below about 300° C. are essential to this improved isomer ratio since when temperatures above about 300° C. are used to activate the catalyst, and then the catalyst is used to polymerize gaseous alpha-olefins, there are obtained in the liquid dimer product increased amounts of undesired isomers of the desired dimer products. This problem is particularly acute because some of these undesired isomers are not easily separated from the desired liquid dimer fraction. For example, when propylene is polymerized using a cobalt oxide on carbon catalyst prepared as described above but activated at temperatures above 300° C., the hexene fraction contains not only the desired n-hexenes but 2-methylpentene-2 which is undesired for detergent preparation purposes and which is only difficultly removed therefrom. However, when a catalyst composition prepared as described above, was activated at temperatures below 300° C., e.g., at about 275° C., very little or none of 2-methylpentene-2 isomer appeared in the n-hexene product.

The purpose of the polymerization reaction in which the catalyst compositions prepared and activated as described above, are used, is to prepare low-boiling liquid olefins, preferably dimers, having from 4 to 8 carbon atoms which have a high ratio of isomers useful as intermediates in dimerization reaction to prepare higher olefins which are useful in making biodegradable detergents, while at the same time eliminating or minimizing the production of isomers not desired for that purpose.

The polymerization process of this invention is conducted by contacting the gaseous alpha-olefin of from 2 to 3 carbon atoms with a catalyst, described above, at temperatures of from about −10° to 200°, preferably at temperatures of from about 10° C. to 85° C. at pressures of from atmospheric to 2500 p.s.i.g., preferably at from about 150 p.s.i.g. to 1000 p.s.i.g. Reaction temperatures below those stated may be used but at such temperatures the rate of conversion of alpha-olefin to dimer product is slow. At temperatures much above that stated the life of the catalyst is shortened to an undesired extent, i.e., the catalyst become inactive in much shorter time periods at such temperatures. Within the given pressure ranges no difference in isomer distribution of straight chain to branched chain isomers appears to be obtained. Although the reaction will proceed at atmospheric pressure the conversion is low so that an optimum pressure of from about 150 p.s.i.g. to 1000 p.s.i.g. is desirably used.

Various types of reactor equipment can be used to conduct the polymerization reaction of this invention. The process can be adapted to use in rocking autoclave systems, fluidized bed systems, continuous tubular flow reactor systems, etc., which are known in the art for preparing liquid polymer products. The process may be conducted by reacting the alpha-olefin in a liquid slurry system at atmospheric pressure, but elevated pressures, as described are preferred. In autoclave systems the reaction is conducted under autogenous pressures which can vary from atmospheric to 1000 p.s.i.g. depending upon the size of the reactor, the temperature of reaction, the amount of catalyst used, etc. In continuous flow reactors employing a fixed bed of catalyst wherein the gaseous or liquified alpha-olefin is passed over or through the catalyst bed, weight space velocities of the gaseous olefin can be varied between about 0.1 and about 40 g. of gaseous olefin per hour per gram of catalyst composition.

A preferred method of operation of the process is to pass the alpha-olefin containing feed under pressure through filter, or molecular sieve devices, which are known in the art, to insure removal of any substantial amounts of water or materials which may poison the catalyst and then into the reactor at pressures sufficient to keep most if not all of the alpha-olefin feed in the liquid phase, and through the catalyst bed.

The temperature of the reaction mixture is kept at the desired temperature by warming devices, such as oil baths, or steam jackets. When operation at ambient temperature is desired no heating device need be used. The process of this invention operates well by allowing the liquid olefin-containing feed to pass through the catalyst bed at room temperatures and allowing the temperatures to rise somewhat as a result of the slightly exothermic nature of the reaction. This technique works especially well with new catalyst materials. As the activity of the catalyst falls off, we have found that the activity can be raised by then raising the temperature to from 75° to 150° or 200° C. The alpha-olefin conversion rate to dimer may be kept at a fairly constant rate by using lower alpha-olefin flow rates through the catalyst bed, e.g., from 0.1 to 2 grams of alpha-olefin per gram of catalyst per hour. Reactor pressures of from about 500 to about 900 p.s.i.g. are preferred for maintaining liquid contact at temperatures of from 10° to 150° C. of alpha-olefin feed with catalyst. However, lower pressures, on the order of down to 50 to 300 p.s.i.g. may be used. At these lower pressures, a portion of the alpha-olefin will be in the gaseous phase. While high flow rates of alpha-olefin over the catalysts are usually initially used, the rate of conversion may be maintained at a fairly high level by reducing the flow rate as the activity of the catalyst falls off.

The alpha-olefin feed may contain, besides the ethylene or propylene up to, say 50% of paraffin hydrocarbon of the same number of carbon atoms, i.e., ethane or propane. Higher quantities of the paraffin may be used, however, at the expense of the loss of some conversion of olefin to dimer. The feed may also contain trace amounts of certain sulfur containing compounds such as thiophene and 1,2-ethane-dithiol. Quantities of such compounds on the order of from 10 to 20 p.p.m. of feed actually enhance the conversion of the adpha-olefin to dimer, although quantities much in excess of 30 p.p.m. tend to reduce the conversion. We have found that for this catalyst system, compounds such as carbon monoxide, and dienes, i.e., diolefins, act as poisons, causing a reduction in the activity of the catalyst and hence should be avoided.

The invention is further illustrated by the following examples which illustrate various aspects of the invention.

EXAMPLE 1

This example illustrates the preparation of a catalyst composition used in the polymerization reaction of this invention.

A. Nitrogen-hydrogen treatment

A 50 g. portion of commercial grade (BPL) activated carbon granules was placed in a perforated basket in a standard tubular gas flow apparatus. Then nitrogen was allowed to flow through the carbon while the temperature was raised to 200° C. Nitrogen flow through the carbon was then discontinued and hydrogen flow through the bed was started at a rate of 88 ml./min. at 35 mm. Hg vacuum. The temperature was raised to 275° C. and maintained at that temperature for five hours. The hydrogen flow was then discontinued and nitrogen flow was started and continued for 1 hour to flush out hydrogen from the vessel. The pressure was raised to atmospheric pressure before removing the hydrogen treated carbon.

B. Cobalt salt impregnation and activation

A 10 g. portion of the nitrogen-hydrogen treated carbon, obtained as above, was added to a solution of 5.83 g. of cobaltous nitrate·hexahydrate in 10 ml. of water (equivalent to 1.5 g. of cobalt oxide (CoO). The mixture was allowed to stand until all of the solution was taken up by the carbon and then vacuum dried for 16 hours at 120° C.

The cobalt salt impregnated carbon so obtained was activated by heating it to 275° C. for five hours under a vacuum of 35 mm. Hg in a nitrogen stream flowing at a rate of 87 ml./min.

EXAMPLE 2

This example illustrates the preparation of a polymerization catalyst wherein the cobalt salt impregnated hydrogen treated carbon, prepared as described in Example 1, is treated with ammonium hydroxide prior to the activation step.

A 10 g. portion of the nitrogen-hydrogen treated activated carbon, prepared as described in Example 1, was added a solution of 5.83 g. of cobalt nitrate·hexahydrate in 10 ml. of water. After take up of solution by the carbon it was vacuum dried for 15 hours at about 120° C. After this drying step 18 ml. of concentrated ammonium hydroxide was added to the cobalt salt impregnated carbon, and it was redried for 24.5 hours in a vacuum oven.

The dried ammonium hydroxide treated cobalt salt impregnated gas treated carbon so obtained was activated by heating it to 275° C. under flowing nitrogen as described in Example 1.

EXAMPLE 3

This example illustrates the advantages of using the improved catalysts, prepared as described in Examples 1 and 2, as compared with the use of CoO on an untreated carbon in the polymerization of propylene.

A control untreated carbon catalyst was prepared by adding 10 g. of BPL commercial grade carbon to a solution of 5.83 g. of cobalt nitrate hexahydrate in 10 ml. of water. The impregnated carbon was vacuum dried, and activated at 275° C. under nitrogen (87 ml./min.) at 35 mm. Hg for 5 hours.

Each of the catalysts so prepared was then used in polymerizing propylene using the following procedure.

Into a 300 ml. rocking type bomb reactor there was placed between about 2–3 g. of the respective cobalt oxide on carbon catalyst, prepared as described in Examples 1 and 2 (control-described in Example 3), and 10 ml. of heptane. The bomb was then closed and cooled in a Dry Ice-acetone bath. The propylene used for these runs was 99.9% pure propylene. It was fed into the bomb until about 100 g. of propylene gas was added. The bomb was then placed in a rocker agitator and the contents of the bomb was warmed to 85° C. over 0.5 to 1 hour and kept at 85° C. for 5 hours to insure complete reaction. The bomb and its contents were then cooled to room temperature, vented of any unreacted propylene, and the liquid content thereof was separated from the catalyst. Conversion was expressed in terms of grams of product per gram of catalyst. The results of the bomb runs with different catalysts systems were as follows:

| Run | Catalyst | Conversion of $C_3H_6$, g. product/g. of catalyst |
|---|---|---|
| 1 | CoO/carbon*(1) | 8.36 |
| 2 | CoO/$N_2$—$H_2$-carbon (2) | 14.2 |
| 3 | B—CoO/$N_2$—$H_2$-carbon (3) | 20.5 |

[1] No $N_2$ or $H_2$ treatment—control.
[2] $N_2$—$H_2$ treatment or carbon before impregnation with cobalt nitrate.
[3] $NH_4OH$ treatment after impregnation with cobalt nitrate on $N_2$—$H_2$ treated carbon; B—CoO denotes $NH_4OH$ after cobalt salt impregnation.
* The carbon used in each run (1–3) was Pittsburgh Coke and Chemical Co.'s type BPL carbon.

EXAMPLE 4

This example compares the effect of untreated carbon catalysts, ammonium hydroxide treated carbon catalysts (copending application S.N. 229,192) and the hydrogen treated carbon catalysts of this invention on the conversion of propylene to the dimer polymerization product.

For the purpose of this example a series of activated carbons, either untreated (control), treated with nitrogen and hydrogen, as described in Example 1, treated with ammonium hydroxide (as described in copending application S.N. 229,192), or treated with nitrogen and hydrogen and then with ammonium hydroxide, were impregnated with an aqueous solution of cobalt nitrate hexahydrate, sufficient to equal about 13% by weight calculated as CoO, and dried. In runs 1, 2, and 3, the dried catalysts so obtained without further treatment were activated in nitrogen for five hours at 275° C. under vacuum of from 35 to 50 mm. Hg.

For runs 4, 5, and 6, the dried cobalt salt impregnated treated carbons were treated with concentrated aqueous ammonium hydroxide by allowing the carbon to take up as much ammonium hydroxide as it would, and then dried, as above.

For runs 7, 8, and 9 the untreated carbon was first washed with nitric acid, washed with water, and then treated with ammonium hydroxide. The carbons were dried and for runs 8 and 9 the carbon was treated with nitrogen-hydrogen as described in Example 1. For run 9 an additional $NH_4OH$ wash was used after the hydrogen treatment. After this treatment the carbons were impregnated with cobalt nitrate hexahydrate solutions, as above, dried, and treated with ammonium hydroxide before activation in nitrogen at 275° C. under vacuum.

Each of the respective catalysts was used to polymerize propylene in a rocking type bomb reactor as described in Example 3. The comparative results are set forth in the following table:

| Run | Catalyst | Propylene Conversion to Dimer | |
|---|---|---|---|
| | | G. of liquid/g. of catalyst | Percent by weight based on $C_3H_6$ in bomb |
| 1 | CoO/carbon (untreated-control). | 8.4 | 22.1 |
| 2 | CoO/$N_2$-$H_2$-treated carbon. | 14.2 | 27.3 |
| 3 | CoO/$NH_4OH$-treated carbon. | 13.6 | 25.9 |
| 4 | $NH_4OH$-treated CoO/$NH_4OH$-treated carbon. | 17.1 | 56.6 |
| 5 | $NH_4$-treated CoO/$N_2$-$H_2$-treated carbon. | 20.9 | 38.7 |
| 6 | $NH_4OH$-treated CoO/$NH_4OH$-treated, $N_2$-$H_2$-treated carbon. | 19.5 | 37.5 |
| 7 | $NH_4OH$-treated CoO/$NH_4OH$-treated, acid washed carbon. | 13.2 | 45.9 |
| 8 | $NH_4OH$-treated, CoO/$N_2$-$H_2$-treated, $NH_4OH$ treated, acid washed carbon. | 20.7 | 61.7 |
| 9 | $NH_4OH$-treated, CoO/$NH_4OH$-treated, $N_2$-$H_2$-treated, $NH_4OH$ treated acid washed carbon. | 21.6 | 73.5 |

The results show that the nitrogen-hydrogen pretreatment of the carbon before the cobalt salt is applied to the carbon almost doubles the yield of liquid olefin polymerization product (about 95% $C_6$ olefin) in comparison with the use of a catalyst prepared from untreated carbon having the same cobalt salt thereon under similar conditions. The nitrogen-hydrogen pre-treated carbon also gave a catalyst which compared favorably with the catalyst prepared from ammonium hydroxide pretreated carbon. The results also show that a second ammonium hydroxide treatment, applied to the cobalt salt impregnated carbon, pretreated with hydrogen, gives a still greater advantage over catalysts prepared from untreated carbon in terms of grams of liquid olefin product per gram of catalyst used. However, when an ammonium hydroxide treatment is applied to a previously $N_2$-$H_2$-treated carbon before the cobalt salt is applied to the carbon, no special advantage in terms of liquid olefin product yield is obtained over a catalyst prepared from $N_2$-$H_2$-treated carbon which was not further treated with ammonium hydroxide prior to cobalt salt application. Thus, it can be seen that the $N_2$-$H_2$ treatment of the carbon can be used as a replacement for the first ammonium hydroxide treatment pretreatment of carbon in the process described and claimed in copending application S.N. 229,192, if desired.

EXAMPLE 5

This example shows the advanatge of the nitrogen treated carbon based catalyst compared to an untreated carbon based catalyst. It also illustrates the advantage of treating the dried cobalt salt impregnated-nitrogen treated carbon with ammonium hydroxide prior to activation of the catalyst. The improvements are shown in terms of increased conversion of the gaseous alpha-olefin to the liquid dimer product per unit of catalyst used.

For this example, a series of activated carbons, either untreated (control), treated with ammonium hydroxide (as described in copending application S.N. 229,192) or treated with nitrogen by passing nitrogen at a flow rate of about 90 ml./min. (STP) over the activated carbon at 275°–300° C. under reduced pressure of about 35–50 mm. Hg pressure for from 2 to 5 hours in a standard laboratory activation tube and then cooling the nitrogen treated carbon, were impregnated with aqueous solutions of cobalt nitrate hexahydrate, sufficient to equal about 13% by weight, calculated as CoO, and dried.

For runs 1 (untreated carbon-control), 2 ($NH_4OH$-carbon), and 3 ($N_2$-carbon) the dried catalysts so obtained without further treatment were activated in nitrogen for five hours at 275° under vacuum of from 35–50 mm. Hg.

For run 4 the ammonium hydroxide-treated carbon impregnated with the cobalt nitrate hexahydrate and dried was again impregnated with concentrated aqueous ammonium hydroxide until it would take up no more solution, and then dried again.

For run 5, the nitrogen treated carbon impregnated with cobalt nitrate hexahydrate was also treated with this concentrated aqueous ammonium hydroxide solution, and dried.

The catalysts for runs 4 and 5 were then activated in the same manner as used for activating the catalysts for runs 1, 2, and 3.

Each of the respective catalysts was used to polymerize propylene in a rocking type bomb reactor as described in Example 3. All the bomb runs for propylene polymerization were run for 5 hours at 85° C. Into the bomb reactors there were placed between 2–4 g. of catalyst, 10 ml. of heptane, and about 100 g. of propylene. The volume of the reactors was about 300 ml.

After the stated time, the bomb reactors were vented of any unreacted propylene, and drained of liquid product and catalyst. The catalysts were filtered off, and the liquid product was taken as product. The results were as follows:

| Run | | Propylene Conversion to Dimer (g. of liquid/g. of catalyst) |
|---|---|---|
| 1 | CoO/untreated carbon | 8.0 (average of 18 runs). |
| 2 | CoO/$NH_4OH$-treated carbon | 13.0 (average of 10 runs). |
| 3 | CoO/$N_2$-treated carbon | 13.5 (average of 4 runs). |
| 4 | $NH_4OH$—CoO/$NH_4OH$-treated carbon. | 28.5 (average of 10 runs). |
| 5 | $NH_4OH$—CoO/$N_2$-treated carbon. | 32.6 (average of 4 runs). |

The results show that cobalt oxide on carbon catalysts, prepared from carbons which have been pre-treated with nitrogen before the cobalt salt is applied to the carbon, catalyze the production of almost double the amount of liquid product obtained with a catalyst prepared from a carbon which has not been pre-treated. The nitrogen pre-treated carbon based catalyst compared favorably with an ammonium hydroxide pre-treated carbon based catalyst in terms of amount of liquid product per unit of catalyst used. The results also show that the ammonium hydroxide post-treatment (applied to the dried cobalt salt impregnated carbon) gave a catalyst which provided an almost quadruple increase in amount of liquid product per unit of catalyst when the ammonium hydroxide was applied to a catalyst prepared from nitrogen-pre-treated carbon. The ammonium hydroxide post-treated cobalt salt on nitrogen-pre-treated carbon catalyst also compared favorably with a catalyst prepared from ammonium hydroxide-pre-treated carbon and post-treated with ammonium hydroxide after the cobalt salt had been applied.

EXAMPLE 6

This example shows the advantage of the hydrogen treated carbon based catalyst compared to an untreated acid washed carbon based catalyst in terms of the liquid dimer product isomer distribution ratio, both catalysts having been prepared under otherwise similar conditions.

For this example a "control" catalyst was prepared by impregnating a nitric acid washed carbon with an aqueous cobalt nitrate solution of concentration sufficient to give a CoO/C. catalyst containing about 13% by weight cobalt, calculated as CoO. Another catalyst was prepared by impregnating a hydrogen-treated carbon with an equivalent amount of cobalt nitrate. After drying this cobalt salt impregnated carbon was treated with ammonium hydroxide. Both catalysts were activated at 275° C. under reduced pressure of from 35 to 50 mm. Hg in a nitrogen stream flowing at about 87 ml./min.

The catalysts so prepared were then used in a rocking type bomb reactor to polymerize propylene at 85° C. for 5 hours as described in Example 3. The liquid products were collected, each being approximately 95% of the total product, and analyzed by standard vapor phase chromatography (VPC) techniques. The analyses were as follows:

| Components (percent by wt.):[1] | Run No. | |
|---|---|---|
| | I. | II. |
| | Type of Catalyst | |
| | NH$_4$OH-treated CoO/H$_2$-treated carbon | CoO/HNO$_3$ treated carbon |
| 4-MP-1 | 4.8 | 3.12 |
| c- and t-4-MP-2 | 37.5 | 37.38 |
| H-1 | 3.4 | 1.40 |
| 2-MP-1 | 3.0 | 3.36 |
| t-H-3 | 4.2 | 7.61 |
| c-H-3 + t-H-2 | 30.3 | 31.99 |
| c-H-2 | 16.8 | 11.94 |
| 2-MP-2 | [2] <0.1 | 2.65 |
| 2,3-DiMB-1 [3] | [2] <0.1 | 0.55 |
| Total straight chain, percent | 54.37 | 52.94 |
| Total branched chain, percent | 45.63 | 47.06 |

[1] In isomer names M is methyl, P is pentene, H is Hexene, e.g. 4-MP-1 is 4-methylpentene-1; c is cis, t is trans, e.g. c-H-3 is cis-hexene-3.
[2] Not determinable on VPC.
[3] 2,3-DiMB-1 is 2,3-dimethylbutene-1.

I claim:
1. A method for preparing low-boiling substantially linear liquid olefins which comprises polymerizing a normally gaseous alpha-olefin of from 2 to 3 carbon atoms at a temperature of from −10° to about 200° C. using a catalyst prepared by treating an activated carbon with a gas consisting of one selected from the group consisting of hydrogen, nitrogen, and nitrogen-hydrogen mixtures, impregnating the gas treated carbon with an aqueous solution of an oxygen containing acid salt of cobalt capable of being decomposed to cobalt oxide when subjected to heating at temperatures not over 300° C., drying the cobalt salt-impregnated gas treated carbon thus obtained, and heating the cobalt salt impregnated carbon thus obtained to temperatures of from 200° C. to 550° C. in an inert gas.

2. A method as described in claim 1 wherein the gas treated carbon is treated with aqueous ammonium hydroxide, and dried prior to impregnating the treated carbon with the cobalt salt.

3. A method as described in claim 1 wherein the cobalt salt impregnated activated carbon is treated with aqueous ammonium hydroxide prior to heating the impregnated activated carbon to 200° C. to 550° C. in the presence of an inert gas.

4. A method as described in claim 1 wherein the aqueous solution of an oxygen containing mineral acid salt of cobalt is an aqueous solution of cobalt nitrate.

5. A method as described in claim 1 wherein the normally gaseous alpha-olefin is polymerized at a temperature of from 10° C. to 85° C.

6. A method as described in claim 1 wherein the normally gaseous alpha-olefin is propylene.

7. A method as described in claim 1 wherein the cobalt salt impregnated activated carbon is heated to from 225° C. to 300° C.

8. A method as described in claim 1 wherein the gaseous alpha-olefin is ethylene.

9. A method for preparing low-boiling substantially linear liquid olefins which comprises polymerizing propylene at a temperature of from −10 to 200° C. using a catalyst prepared by treating an activated carbon with a gas consisting of one which is selected from the group consisting of nitrogen, hydrogen and hydrogen-nitrogen mixtures, impregnating the gas treated activated carbon with an aqueous solution of cobalt nitrate, drying the cobalt nitrate impregnated, activated carbon, and heating the cobalt nitrate impregnated, gas-treated activated carbon thus obtained to from about 200° C. to 300° C.

10. A method as described in claim 9 wherein the dried cobalt nitrate impregnated activated carbon is treated with ammonium hydroxide prior to heating the impregnated activated carbon to 200° C. to 300° C.

11. A method for preparing a catalyst composition which comprises treating an activated carbon with a gas consisting of one selected from the group consisting of nitrogen, hydrogen and hydrogen-nitrogen mixtures, impregnating the thus treated activated carbon with an aqueous solution of an oxygen containing mineral acid cobalt salt, drying the thus impregnated activated carbon, and heating the impregnated activated carbon thus obtained to from 200° C. to 550° C. in an inert atmosphere.

12. A method as described in claim 11 wherein the oxygen containing mineral acid cobalt salt is cobalt nitrate.

13. A method as described in claim 11 wherein the dried cobalt salt impregnated activated carbon is heated to from 200° C. to 300° C.

14. A method as described in claim 11 wherein the dried cobalt salt impregnated activated carbon is treated with ammonium hydroxide prior to heating the impregnated activated carbon to from 200° C. to 550° C.

15. A method as described in claim 14 wherein the oxygen containing acid cobalt salt is cobalt nitrate.

16. A method as described in claim 11 wherein the inert atmosphere is a gas selected from the group consisting of nitrogen, helium, methane, propane and carbon dioxide.

17. A method as described in claim 11, wherein the impregnated activated carbon is heated to from 200° C. to 550° C. in a vacuum.

References Cited

UNITED STATES PATENTS

| | | | |
|---|---|---|---|
| 2,516,233 | 7/1950 | McKinnis | 252—445 |
| 2,599,249 | 6/1952 | Friedman | 260—683.15 |
| 2,692,295 | 10/1954 | Peters | 260—683.15 |
| 2,721,184 | 10/1955 | Voorhies | 252—445 |
| 3,271,475 | 9/1966 | Weesner | 260—683.15 |
| 3,271,743 | 9/1966 | Engelbrecht et al. | 260—683.15 |

PAUL M. COUGHLAN, Jr., *Primary Examiner.*